(12) United States Patent
Shock et al.

(10) Patent No.: US 8,020,585 B2
(45) Date of Patent: Sep. 20, 2011

(54) APPARATUS AND METHOD FOR DETECTING A LEAK WITHIN A DUPLEX VALVE ASSEMBLY

(75) Inventors: Robert Shock, Meriden, CT (US); Steven Weiss, Naugatuck, CT (US); Andrew Mieczkowski, Meriden, CT (US)

(73) Assignee: Airgas, Inc., Cheshire, CT (US)

( * ) Notice: Subject to any disclaimer, the term of this patent is extended or adjusted under 35 U.S.C. 154(b) by 546 days.

(21) Appl. No.: 12/196,652

(22) Filed: Aug. 22, 2008

(65) Prior Publication Data
US 2010/0043896 A1    Feb. 25, 2010

(51) Int. Cl.
*E03B 1/00* (2006.01)
(52) U.S. Cl. .......................... 137/613; 137/554; 137/556
(58) Field of Classification Search .................. 137/613, 137/312, 553, 554, 556
See application file for complete search history.

(56) References Cited

U.S. PATENT DOCUMENTS

| | | | | |
|---|---|---|---|---|
| 3,100,504 A | * | 8/1963 | Kauer, Jr. ...................... | 137/613 |
| 6,057,771 A | * | 5/2000 | Lakra ............................ | 137/554 |
| 6,255,609 B1 | * | 7/2001 | Samuelson et al. .......... | 200/83 L |
| 6,321,781 B1 | * | 11/2001 | Kurth ............................ | 137/554 |
| 6,691,980 B2 | | 2/2004 | Larsen et al. | |
| 6,725,878 B1 | * | 4/2004 | Nawa et al. ................... | 137/613 |

* cited by examiner

*Primary Examiner* — Kevin Lee
(74) *Attorney, Agent, or Firm* — RatnerPrestia

(57) ABSTRACT

A leak detection system for detecting a leak within a duplex valve assembly is disclosed. The duplex valve assembly includes a first valve, a second valve and an intermediate fluid flow passageway fluidly interconnecting the first valve to the second valve. The leak detection system includes a means for indicating whether the first valve is maintained in a closed position or an open position, a means for indicating whether the second valve is maintained in a closed position or an open position, and a pressure change detector within the intermediate fluid flow passageway. The pressure change sensing means is at least partially positioned within the intermediate fluid flow passageway for detecting a pressure change within the intermediate fluid flow passageway.

8 Claims, 9 Drawing Sheets

APPARATUS AND METHOD FOR DETECTING A LEAK WITHIN A DUPLEX VALVE ASSEMBLY

FIELD OF THE INVENTION

The disclosed invention relates to a duplex valve for controlling the flow of a fluid therethrough and a method of operating the duplex valve.

BACKGROUND OF THE INVENTION

In conventional facilities having a fluid distribution system for distributing various types of liquids, gasses, or other fluids, fluids are distributed through piping from a fluid source (e.g., a gas manifold or a gas cylinder) to a particular destination (e.g., a gas cylinder, fluid-powered equipment, an exhaust outlet, or a storage tank). A valve may be fluidly coupled to the piping to safely control the flow of fluid from the fluid source to the destination. Particular care might be taken to prohibit or minimize leakage of fluid through the valve when the valve is maintained in a closed position. Manufacturers of fluid distribution systems, valves and fluid-powered equipment, for example, continually strive to improve valves configured for use in fluid distribution systems in the interests of safety, performance, reliability, cost and/or manufacturability.

SUMMARY OF THE INVENTION

According to an aspect of the invention, a leak detection system for detecting a fluid leak within a duplex valve assembly is provided. The duplex valve assembly includes a first valve, a second valve and an intermediate fluid flow passageway fluidly interconnecting the first valve to the second valve. The leak detection system includes a means for indicating whether the first valve is maintained in a closed position or an open position, a means for indicating whether the second valve is maintained in a closed position or an open position, and a pressure change detector for sensing a pressure change within the intermediate fluid flow passageway. The pressure change detector is at least partially positioned within the intermediate fluid flow passageway for detecting a pressure change within the intermediate fluid flow passageway.

According to another aspect of the invention, a duplex valve assembly is provided. The duplex valve assembly includes a first valve assembly and a second valve assembly. Each valve assembly includes an inlet opening for receiving fluid, an outlet opening for the delivery of fluid, a fluid flow passageway defined between the inlet opening and the outlet opening, a means for controlling the flow of fluid through the fluid flow passageway, and a means for indicating whether the valve assembly is maintained in a closed position or an open position. An intermediate fluid flow passageway is defined between the outlet opening of the first valve assembly and an inlet opening of a second valve assembly for the delivery of fluid from the first valve assembly to the second valve assembly. A pressure change detector for sensing a pressure change within the intermediate fluid flow passageway is at least partially positioned within the intermediate fluid flow passageway to detect a fluid leakage at either the first valve assembly or the second valve assembly. A control system receives data from the indicating means of the first valve, the indicating means of the second valve and the pressure change detector. The control system is configured to indicate an occurrence of a fluid leakage when the pressure change detector detects a fluid leakage and both indicating means indicate that the valve assemblies are maintained in a closed position.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Figure 1:
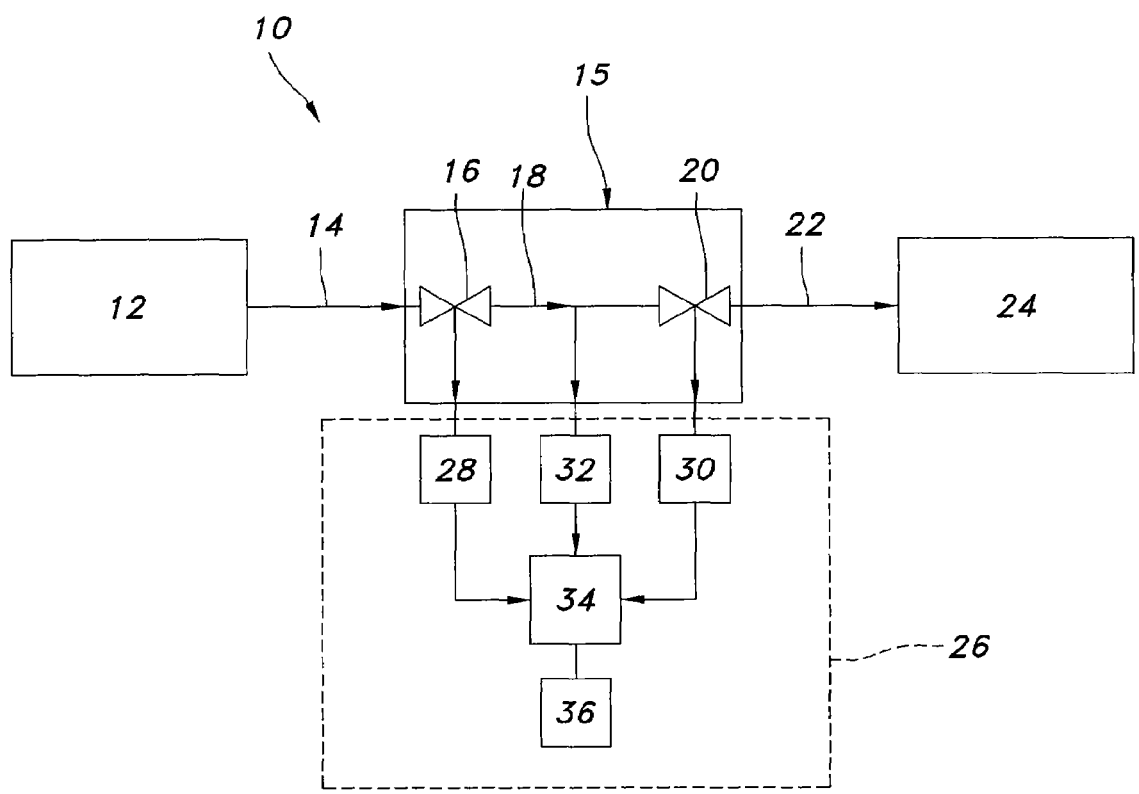
FIG. 1 is a schematic block diagram of a fluid distribution system including a fluid source, a fluid target, a duplex valve assembly fluidly coupled between the fluid source and the fluid target, and a control system configured for detecting a fluid leak within the duplex valve assembly in accordance with an exemplary embodiment of the present invention.
Figure 2:
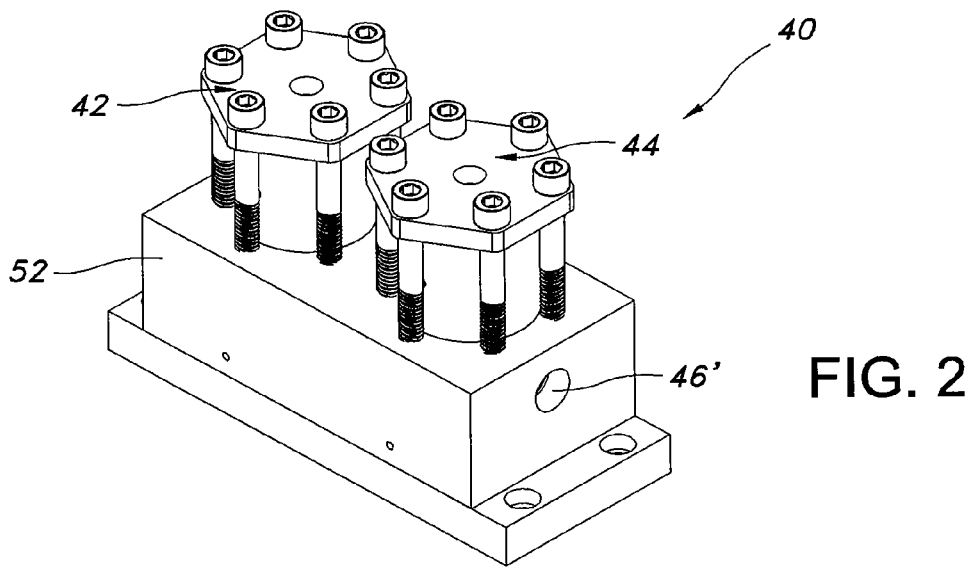
FIG. 2 is a perspective view of a duplex valve assembly in accordance with an exemplary embodiment of the present invention.
Figure 3:
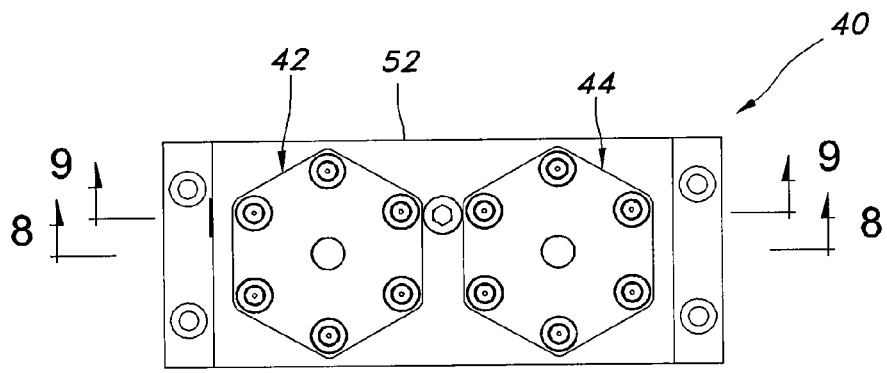
FIG. 3 is a top plan view of the duplex valve assembly of FIG. 2.
Figure 4:
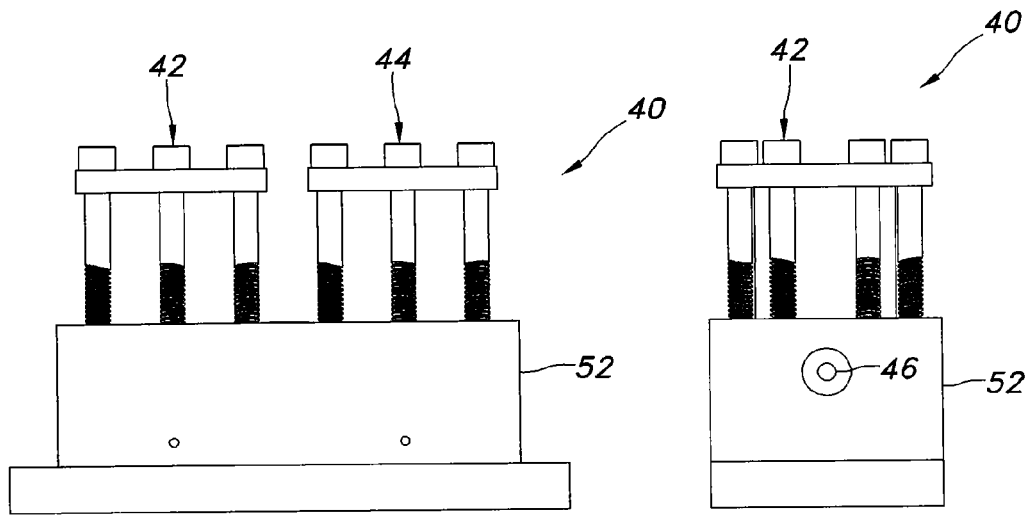
FIG. 4 is a front elevation view of the duplex valve assembly of FIG. 2.
Figure 5:
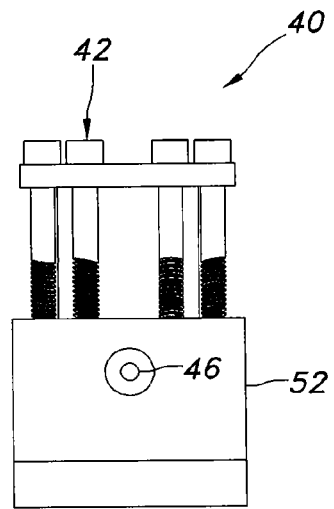
FIG. 5 is an elevation view from the left side of the duplex valve assembly of FIG. 2; the right side elevation view does not differ substantially from the left side elevation view.
Figure 6:
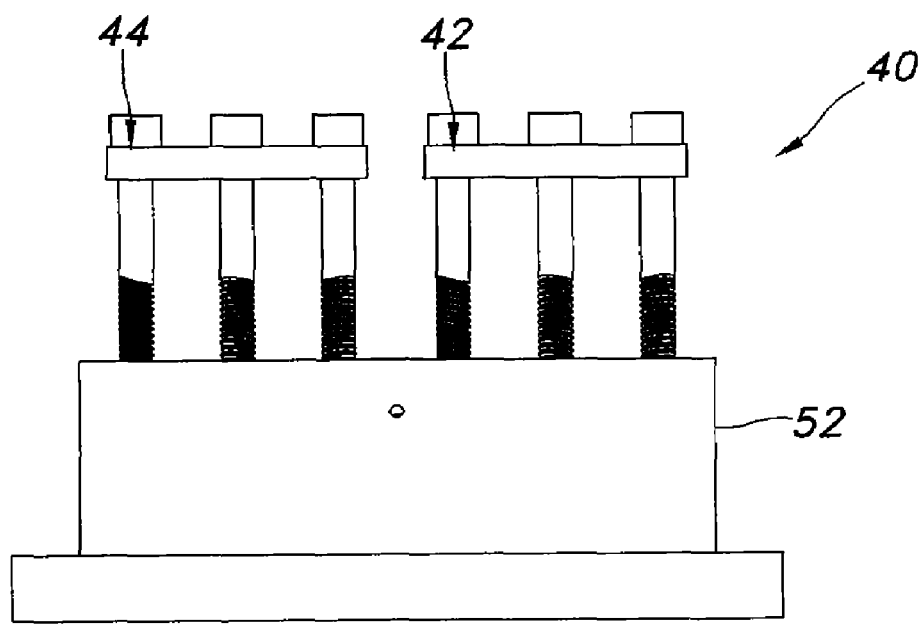
FIG. 6 is a rear elevation view of the duplex valve assembly of FIG. 2.
Figure 7:
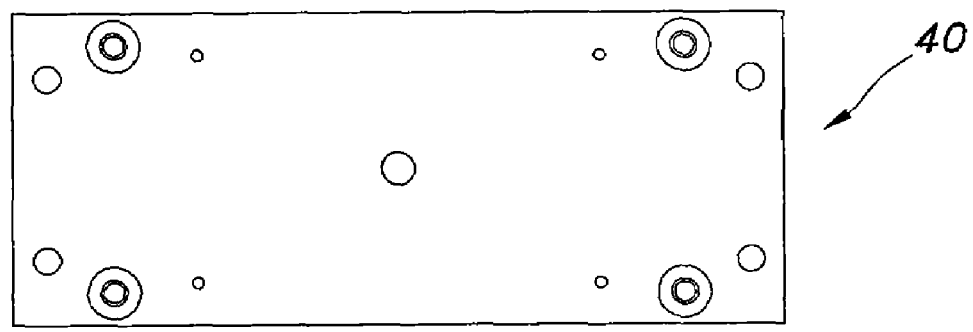
FIG. 7 is a bottom plan view of the duplex valve assembly of FIG. 2.

The invention is best understood from the following detailed description when read in connection with the accompanying drawing figures, which shows exemplary embodiments of the invention selected for illustrative purposes. The invention will be illustrated with reference to the figures. Such figures are intended to be illustrative rather than limiting and are included herewith to facilitate the explanation of the present invention. In the various embodiments like item numbers represent substantially similar features.

Referring generally to the figures, a leak detection system for detecting a fluid leak within a duplex valve assembly 15, 40 is provided. The duplex valve assembly 15, 40 includes a first valve 16, 42, a second valve 20, 44 and an intermediate fluid flow passageway 18, 90 fluidly interconnecting the first valve 16, 42 to the second valve 20, 44. The leak detection system includes a means 28, 100 for indicating whether the first valve 16, 42 is maintained in a closed position or an open position, a means 30, 100' for indicating whether the second valve 20, 44 is maintained in a closed position or an open position, and a pressure change detector 32, 92 for sensing a pressure change within the intermediate fluid flow passageway 18, 90. The pressure change detector 32, 92 is at least partially positioned within the intermediate fluid flow passageway 18, 90 for detecting a pressure change within the intermediate fluid flow passageway 18, 90. The pressure change detector 32, 92 is also referred to herein as a pressure change sensing means.

According to another aspect of the invention, a duplex valve assembly 15, 40 is provided. The duplex valve assembly 15, 40 includes a first valve assembly 16, 42 and a second valve assembly 20, 44. Each valve assembly 16, 20 and 42, 44 includes an inlet opening 46, 88' for receiving fluid, an outlet opening 88, 46' for the delivery of fluid, a fluid flow passageway 48, 48' defined between the inlet opening 46, 88' and the outlet opening 88, 46', a means 54 and 56 for controlling the flow of fluid through the fluid flow passageway 48, 48', and a means 28, 30, 100, 100' for indicating whether the valve assembly 16, 20, 42, 44 is maintained in a closed position or an open position. An intermediate fluid flow passageway 18, 90 is defined between the outlet opening 88 of the first valve assembly 42 and an inlet opening 88' of a second valve assembly 44 for the delivery of fluid from the first valve assembly 42 to the second valve assembly 44. A pressure change detector 32, 92 for sensing a pressure change within the intermediate fluid flow passageway 18, 90 is at least partially positioned within the intermediate fluid flow passageway 18, 90 to detect a fluid leakage at either the first valve assembly 16, 42 or the second valve assembly 20, 44. A control system 26, 50 receives data from the indicating means 28, 100 of the first valve assembly 16, 42, the indicating means 30, 100' of the second valve assembly 20, 44 and the pressure change detector 32, 92. The control system 26, 50 is configured to indicate an occurrence of a fluid leakage when the pressure change detector 32, 92 detects a fluid leakage and both indicating means 28, 30 and 100, 100' indicate that the valve assemblies 16, 20 and 42, 44 are maintained in a closed position.

Referring now to the individual figures, FIG. 1 depicts a schematic block diagram of a fluid distribution system 10. The fluid distribution system 10 comprises a fluid source 12 containing a fluid (not shown). The fluid source 12 may contain gas, liquid, or any other fluid. Additionally, the fluid source 12 may represent a plurality of fluid sources, e.g., a hydrogen gas cylinder and a neon gas cylinder. The fluid source 12 is fluidly coupled to one end of a conduit 14 to deliver fluid into conduit 14. The opposing end of conduit 14 is fluidly coupled to an inlet of a duplex valve assembly 15 for delivering fluid from fluid source 12 into duplex valve assembly 15. An outlet of duplex valve assembly 15 is fluidly coupled to an end of another conduit 22 for delivering fluid into conduit 22. The opposite end of conduit 22 is fluidly coupled to a fluid target 24 for delivering fluid into fluid target 24. A control system 26 communicates with the duplex valve assembly 15 to detect a fluid leak within the duplex valve assembly 15.

The duplex valve assembly 15 includes a first valve 16 that is fluidly coupled to a second valve 20 by an intermediate fluid flow passageway 18 (passageway 18 hereinafter). Item 15 is generally referred to as a "duplex valve assembly" for the reason that it includes two valves 16 and 20. According to one aspect of the invention, the duplex valve assembly 15 includes two valves 16 and 20 arranged in series in the event of failure of either valve 16 or valve 20. Each valve 16 and 20 may be provided as any traditional valve, such as a shut-off valve, for example. The first valve 16 is fluidly coupled to conduit 14 for receiving fluid from fluid source 12 and second valve 20 is fluidly coupled to conduit 22 for delivering fluid into fluid target 24. In an open position of first valve 16, fluid is permitted to flow from conduit 14 and through the first valve 16 into passageway 18. In an open position of second valve 20, fluid is permitted to flow from passageway 18, through the second valve 20 and into conduit 22. Thus, in an open position of both valves 16 and 20, fluid is free to flow from fluid source 12 to fluid target 24.

In a closed position of both valves 16 and 20, fluid is prohibited from travelling from fluid source 12 to fluid target 24. In the event of failure of a valve, the failed valve might permit the flow of fluid therethrough even though it is maintained in a closed position (i.e., closed to flow). For that and other reasons, the fluid distribution system 10 includes a control system 26 that is configured to monitor and detect a fluid leakage within duplex valve assembly 15.

More particularly, the control system 26 includes means 28 for indicating whether first valve 16 is maintained in a closed position or an open position, and a means 30 for indicating whether second valve 20 is maintained in a closed position or an open position. The means 28 and 30 for indicating are configured to transmit the open or closed status of the valves 16 and 20, respectively, to a controller 34 of control system 26.

The means 28 and 30 for indicating may be provided in the form of a position sensor for indicating whether the internal components of each valve are set to a particular position (i.e., an open position or a closed position). Such a position sensor is described in greater detail with reference to FIG. 8. Alternatively, the means 28 and 30 for indicating may be provided in the form of a pressure sensor that is configured to monitor the pressure across the valves 16 and 20, respectively. The means 28 and 30 for indicating may also be provided in the form of a limit switch, a proximity switch, a magnetic reed switch, a Hall effect sensor, a contact, an optical detector, an ultrasonic detector, a capacitive position indicator or a visual indicator, for example.

The control system 26 further comprises a pressure change detector 32 for sensing a pressure change within the passageway 18 of duplex valve assembly 15. The pressure change detector 32 is at least partially positioned within passageway 18 to detect a leakage at either first valve 16 or second valve 20. More particularly, if either valve 16 or 20 unexpectedly permits the passage of fluid therethrough, the fluid pressure within passageway 18 will change. The pressure change detector 32 is configured to sense that pressure change within passageway 18 and transmit a signal to the controller 34.

The pressure change detector 32 may be provided in the form of a position sensor, as described in greater detail with reference to FIG. 9. Alternatively, pressure change detector 32 may be provided in the form of a pressure sensor that is configured to monitor the pressure within passageway 18. As yet another alternative, pressure change detector 32 may be provided in the form of a commercially available fluid flow meter. The pressure change detector 32 may also be provided in the form of a displaced piston, a pressure transducer, a pressure gage, an electronically read Bourdon tube, a strain gage, a manometer, or any other pressure change detector known in the art. The pressure change detector 32 is also referred to herein as a pressure change sensing means.

According to this exemplary embodiment, controller 34 includes at least three inputs for receiving signals that are transmitted from means 28 and 30 and pressure change detector 32, as shown in FIG. 1. A processor (not shown) of the controller 34 is configured to determine the setting of each valve 16 and 20 (i.e., a closed or open position) based upon the signals transmitted by means 28 and 30, respectively. The processor of the controller 34 is further configured to determine whether pressure change detector 32 sensed a pressure change within the passageway 18, and, optionally, a value corresponding to and indicative of that pressure change.

In the event that the signal transmitted by pressure change detector 32 indicates a pressure change occurrence in passageway 18 while the signals transmitted by means 28 and 30 indicate that both valves 16 and 20 are maintained in a closed position, the controller 34 is configured to transmit a signal to indicate the occurrence of a leak within the duplex valve assembly 15. More particularly, in such an event, controller 34 is configured to transmit a signal to a means 36 for indicating. The controller 34 includes an output for communicating with the means 36 for indicating.

The means 36 for indicating alerts an end-user that one or more of the valves 16 and 20 of duplex valve assembly 15 is leaking fluid. The means 36 for indicating may be IS visual and/or audible. By way of non-limiting example, the indication to the end-user may provided by way of an LED light, a prompt on a computer monitor, an audible beep, a visual signal, a reading on a dial, or any other indicator known in the art. The signal transmitted by the controller 34 indicating an occurrence of a leakage may be relayed to a computer, a programmable logic controller (PLC) or other controlling device that is configured to take a control action to isolate the leak or otherwise alter the state of the connected system.

According to one exemplary use of the invention, if first valve 16 fails, thereby permitting fluid to flow within passageway 18, the fluid pressure within passageway 18 would increase. The pressure change detector 32 would sense that increase in pressure within passageway 18 and send a signal to controller 34 indicating an increase in pressure (or a pressure change, generally). The processor of the controller 34 is configured to compare the status of valves 16 and 20 (by way of means 28 and 30) with the pressure change within passageway 18 (by way of pressure change detector 32). Once the processor of the controller 34 recognized that a change in pressure within passageway 18 occurred while the valves 16 and 20 were set to a closed position, the processor would transmit a signal to means 36 to alert the end user to the leakage of valve 16, or, more generally, a leakage of duplex valve assembly 15.

According to another exemplary use of the invention, if second valve 20 fails, thereby permitting fluid to flow out of passageway 18, the fluid pressure within passageway 18 would decrease. The pressure change detector 32 would sense that decrease in pressure and send a signal to controller 34 indicating a pressure change. The processor of the controller 34 is configured to compare the status of the valves 16 and 20 (by way of means 28 and 30) with the pressure change within passageway 18 (by way of pressure change detector 32). Once the processor of controller 34 recognized that a change in pressure within passageway 18 occurred while valves 16 and 20 were set to a closed position, the processor would transmit a signal to means 36 to alert the end user to the leakage of second valve 20, or, more generally, a leakage of duplex valve assembly 15.

According to one aspect of the invention, the processor of the controller 34 is configured to calculate or interpolate a value indicative of a pressure change within passageway 18 based upon the signal received from pressure change detector 32. The processor of the controller 34 is optionally configured to compare that pressure change value with a pre-determined threshold value. If the pressure change value exceeds the pre-determined threshold value, the controller 34 will transmit a signal to means 36. Conversely, if the pressure change value does not exceed the pre-determined threshold value, the controller 34 will take no action.

Although not shown, the control system 26 may include a clock for time-stamping each pressure change occurrence in an effort to determine the timing and duration of any occurrence(s). According to one aspect of the invention, controller 34 will only transmit a signal to means 36 if the time duration of the leakage exceeds a threshold valve.

FIGS. 2-11 depict one exemplary embodiment of a duplex valve assembly 40. The duplex valve assembly 40 generally includes two valve assemblies 42 and 44 fluidly coupled in series and a control system 50 for detecting a fluid leak within either valve assembly 42 or valve assembly 44. The duplex valve assembly 40 was shown schematically in FIG. 1 as item 15 and the control system 50 was shown schematically in FIG. 1 as item 26.

The duplex valve assembly 40 includes a first valve assembly 42 and a second valve assembly 44 fluidly coupled in series with the first valve assembly 42. The valve assemblies 42 and 44 are juxtaposed on opposing sides of duplex valve assembly 40. According to one aspect of the invention, the duplex valve assembly 40 is entirely symmetrical. Accordingly, it follows that the first valve assembly 42 may be coupled to a fluid source (not shown in FIGS. 2-11) to receive fluid from the fluid source and the second valve assembly 44 may be coupled to a fluid target (not shown in FIGS. 2-11) to deliver fluid into the fluid target, or vice versa, i.e., first valve assembly 42 coupled to a fluid target and second valve assembly 44 coupled to a fluid source. For the purpose of simplicity and clarity hereinafter, the first valve assembly 42 will be assumed to receive fluid directly from a fluid source and the second valve assembly 44 will be assumed to distribute fluid to a target source, even though the opposite could occur.

Each valve assembly 42 and 44 generally includes an inlet for receiving fluid, an outlet for distributing fluid, a fluid flow passageway defined between the inlet and the outlet, and a means for controlling the flow of fluid through the fluid flow passageway. According to this exemplary embodiment, the controlling means is provided in the form of a piston-driven valve stem and valve seat arrangement configured to operate together to control the flow of fluid between the inlet and the outlet of each valve assembly 42 and 44. In addition to a piston-driven valve stem and seat arrangement, the controlling means may be provided in the form of a rotating ball or plug, a sliding piston and cage, a vane or shutter, a butterfly valve, or any other valve-type known in the art for controlling the flow of fluid through a passageway.

According to one aspect of the invention, the valve assemblies 42 and 44 share the same components and operate under the same principles. For that reason, only the individual components and operation of valve assembly 42 is described in detail hereinafter.

Figure 8:
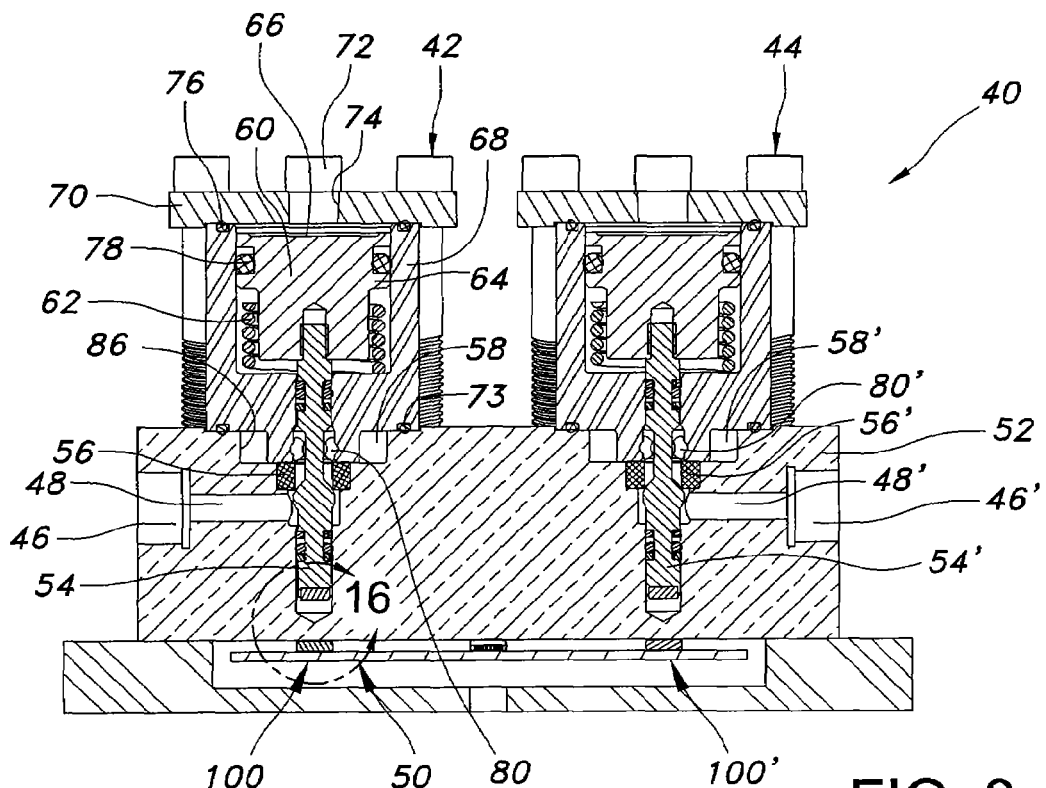
FIG. 8 is a cross-sectional view of the duplex valve assembly of FIG. 3 taken along the lines 8-8.

The valve assembly 42 generally includes an inlet 46 (see FIGS. 5 and 8) for coupling to a fluid source (not shown) to receive fluid from the fluid source (such as a gas cylinder or manifold). As best shown in FIG. 8, a fluid passageway 48 formed in a housing 52 extends from inlet 46 to provide a passageway through which fluid is delivered into valve assembly 42.

The valve assembly 42 includes a valve stem 54 which cooperates with a valve seat 56 to control the flow of fluid through the valve assembly 42. More particularly, the valve stem 54 translates vertically within a stepped bore 57 (see FIG. 14) formed in housing 52. The stepped bore 57 forms part of the fluid passageway 48. The valve seat 56 is also positioned in bore 57 or defined on a surface of bore 57 of housing 52. The valve stem 54 includes a narrow portion that passes through a central aperture provided in valve seat 56. The valve stem 54 further includes a sealing surface that is designed to mate and seal with a sealing surface of the valve seat 56 to prevent the passage of fluid therebetween. The valve seat 56 may be defined on a surface of the bore provided in housing 52, or, alternatively, the valve seat 56 may be a separate component (as shown). The valve seat 56 may be composed of Chlorotrifluoroethylene (CTFE), for example, or any other suitable material known to those skilled in the art.

It should be understood that in a closed position of valve assembly 42 (as shown in FIG. 8), the valve stem 54 bears on a surface of the valve seat 56 to prohibit the passage of fluid through the interface between the valve seat 56 and the valve stem 54. In an open position of valve assembly 42 (not shown), the sealing surface of valve stem 54 is separated from the sealing surface of valve seat 56 to permit the passage of fluid therebetween and into the annular chamber 58.

The valve stem 54 is fixedly mounted to (or may be integrated with) a moveable piston 60 that translates vertically within a bonnet 68. Translation of the piston 60 causes translation of the valve stem 54 with respect to the valve seat 56. A spring 62 is positioned to bear on a shoulder 64 of the piston 60 to bias piston 60 in the vertical direction toward plate 70, consequently biasing valve stem 54 to bear on valve seat 56. Accordingly, by virtue of spring 62, the entire valve assembly 42 is biased to a closed position to prohibit the flow of fluid therethrough.

Although not shown, an actuator is positioned on or adjacent the top side 66 of piston 60 for selectively driving piston 60 in the downward direction against the force of spring 62 to open the valve assembly 42 thereby permitting the flow of fluid therethrough. By way of example, a user could activate the actuator to depress piston 60, consequently separating valve stem 54 from valve seat 56, thereby permitting the flow of fluid through valve assembly 42. The actuator may be a commercially available three-way valve, such as those distributed by the Festo Corporation of Germany, or any other actuator that is capable of translating a piston known to those skilled in the art. In lieu of an actuator and piston 60, the valve stem 54 may be driven by a solenoid or other electrical means, a rotating or screw-type mechanism, or by mechanical leverage.

The piston 60 is moveably encapsulated within a cylindrical bonnet 68. The bonnet 68 includes an aperture 84 (see FIGS. 10 and 12), one end of which is exposed to the interior of bonnet 68 and the other end of which is exposed to the atmosphere, to permit translation of piston 60 within the interior of bonnet 68. The bonnet 68 includes a bore 69 (see FIG. 12) to accommodate valve stem 54. A plate 70 is positioned on the top end of bonnet 68 and a series of six bolts 72 are employed to fasten bonnet 68 to housing 52 through the engagement of each bolt 72 in a respective threaded bore 53 (see FIG. 14) defined on a top surface of housing 52. An o-ring 73 is positioned between the bottom surface of the bonnet 68 and the top surface of the housing 52 to limit any fluid leakage at the interface between the housing 52 and the bonnet 68.

The plate 70 includes a centrally located aperture 74 to provide access for the actuator (not shown), which selectively drives the piston in a downward direction (i.e. away from plate 70). According to one aspect of the invention, the actuator distributes a stream of air onto top surface 66 of piston 60 to drive piston 60 in the downward direction. An o-ring 76 is positioned between the top surface of the bonnet 68 and the bottom surface of plate 70 to limit any air leakage at the interface between bonnet 68 and plate 70. Another o-ring 78 is positioned within an annular channel defined in piston 60 to further limit the passage of air between piston 60 and the revolved interior surface of bonnet 68.

Referring back to the flow of fluid through valve assembly 42, in an open position of valve assembly 42, the fluid flows through a annular gap disposed between the sealing surfaces of valve stem 54 and valve seat 56. The fluid then travels upwards toward an inlet provided in the bottom end of bonnet 68. The passage of fluid through the bottom end of bonnet 68 is best described with reference to FIGS. 11 and 12.

Figure 11:
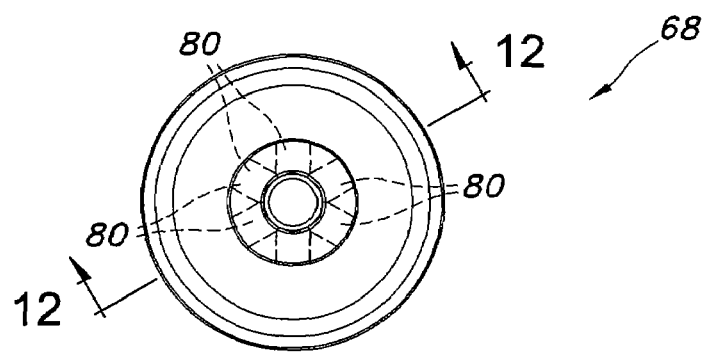
FIG. 11 is a top plan view of the bonnet of the duplex valve assembly of FIG. 2, wherein the broken lines reveal fluid passages provided in the bottom end of the bonnet.
Figure 12:
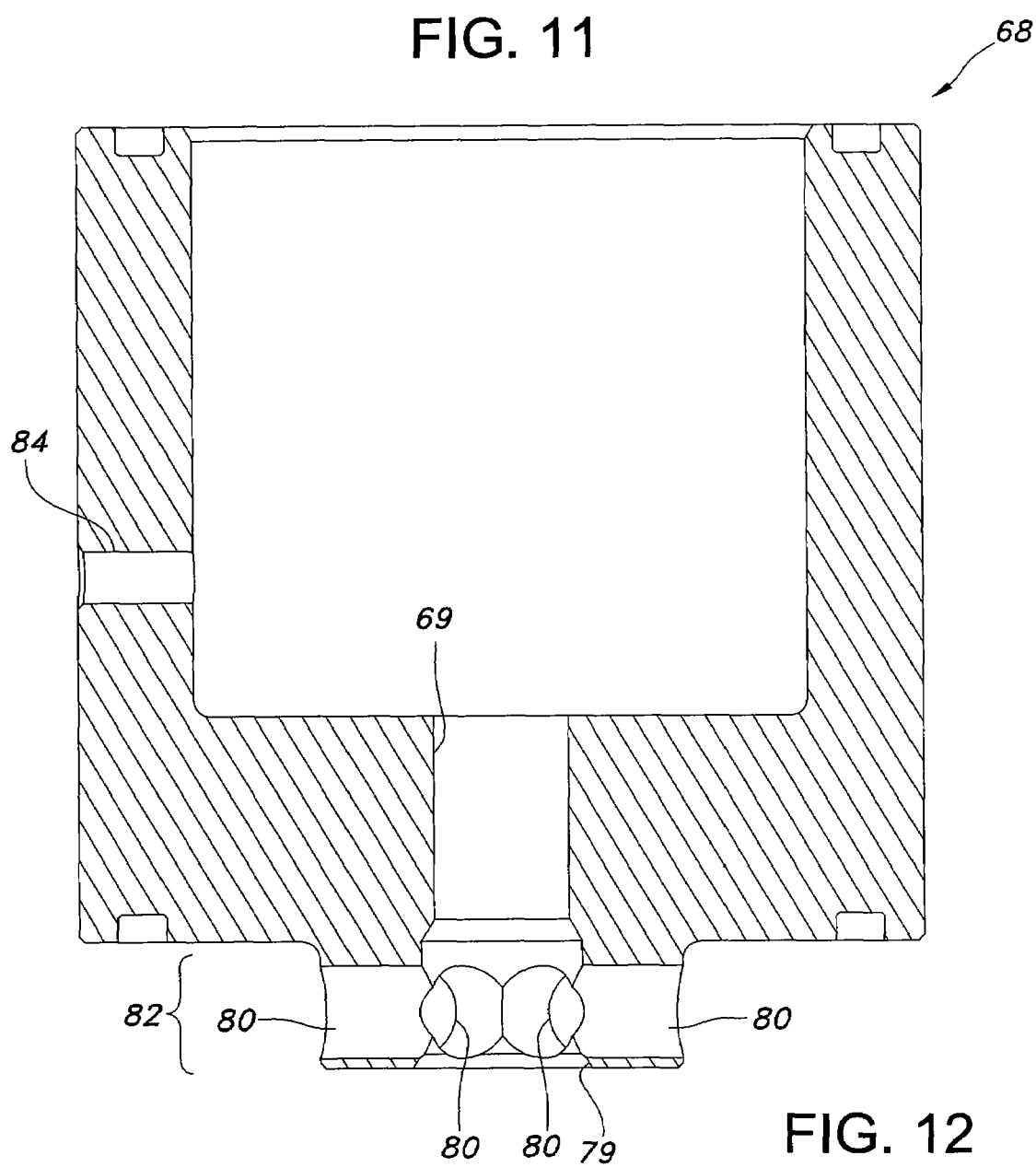
FIG. 12 is a cross-sectional view of the bonnet of FIG. 11 taken along the lines 12-12.

FIGS. 11 and 12 depict a top plan view and a cross-sectional side view, respectively, of bonnet 68 of FIG. 8. According to one aspect of the invention, an inlet hole 79 is provided in cylindrical bottom end portion 82 of bonnet 68, to receive fluid from fluid passageway 48 (see FIG. 8). The fluid then enters into a plurality of fluid passages 80 (six shown), each flow passage radially extending from inlet hole 79 to the revolved outer surface of bottom end 82 of bonnet 68. The fluid passages 80 of bonnet 68 may vary from that shown in the figures, and may comprise any shape, size or number.

Referring back to FIG. 8, the fluid is expelled from bonnet 68 through fluid passages 80 into annular chamber 58. The annular chamber 58 is defined between the revolved surfaces of bottom end portion 82 of bonnet 68 and the revolved surface of a cylindrical surface 86 of the bore 57 defined in housing 52. Fluid then flows through internal fluid passageways of housing 52, as best described with reference to FIGS. 13-15.

Figure 13:
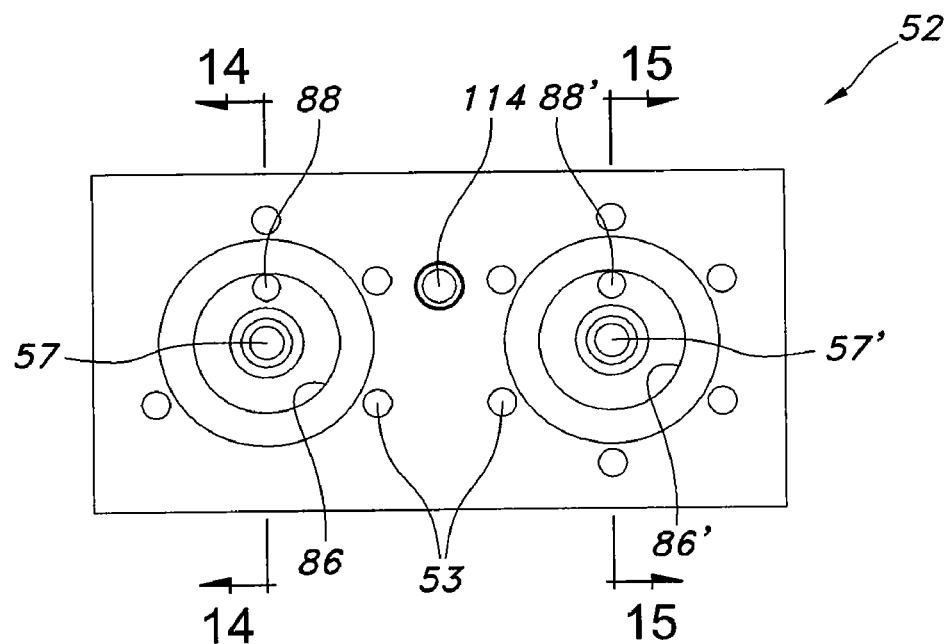
FIG. 13 is a top plan view of the housing of FIG. 2.
Figure 14:
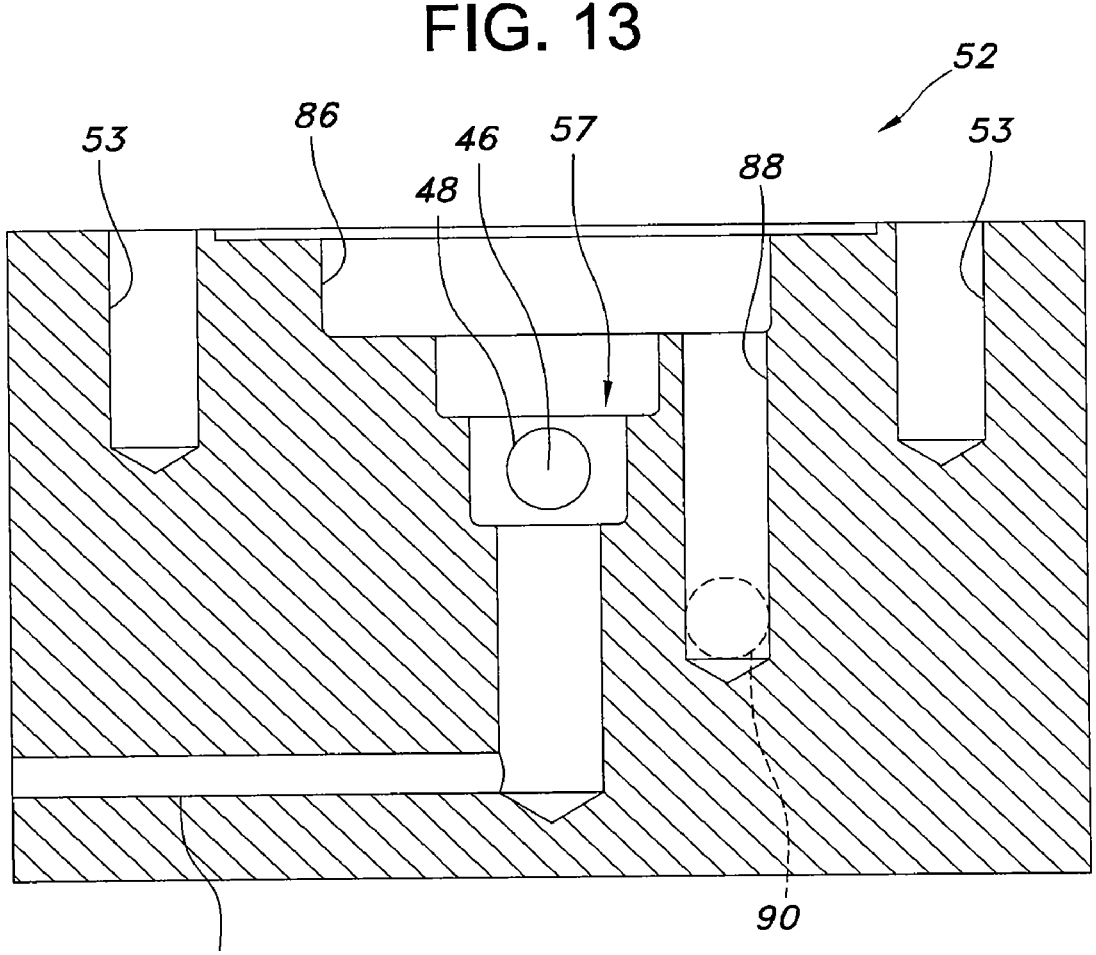
FIG. 14 is a cross-sectional view of the housing of FIG. 13 taken along the lines 14-14 and rotated ninety degrees in a clockwise direction.
Figure 15:
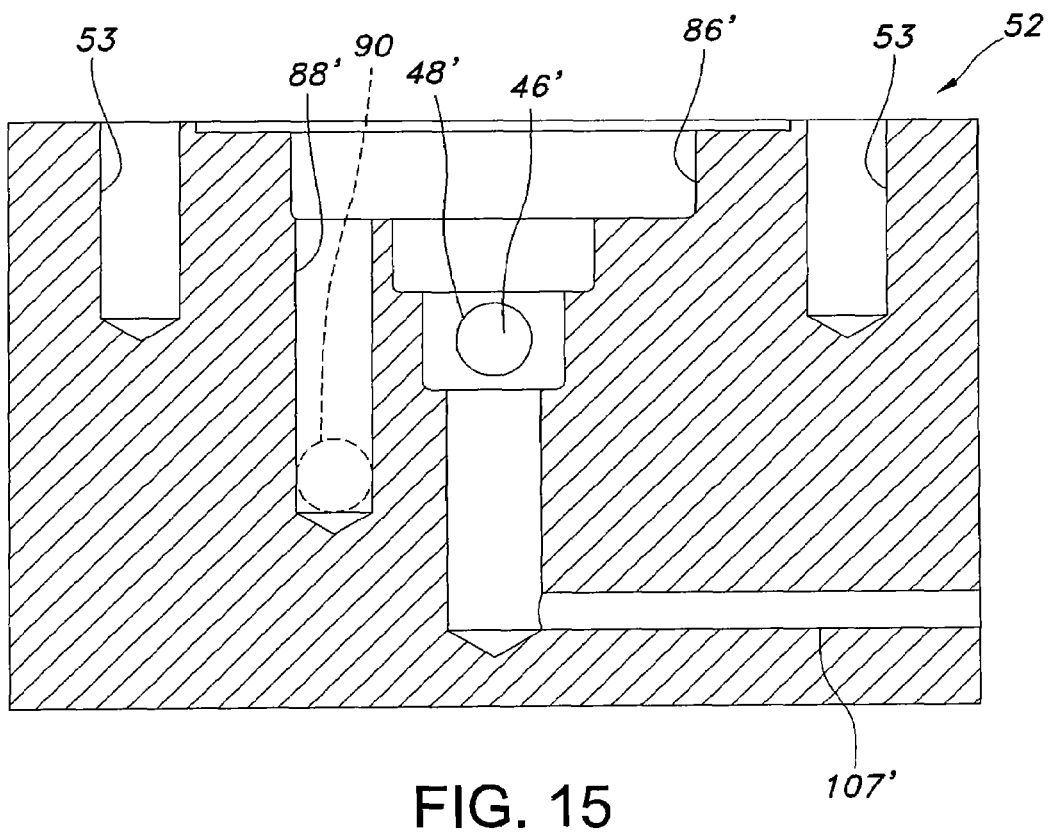
FIG. 15 is a cross-sectional view of the housing of FIG. 13 taken along the lines 15-15 and rotated ninety degrees in a counter-clockwise direction.

FIGS. 13-15 depict a top plan view and two cross-sectional views of housing 52 of FIGS. 2-11. As best shown in FIGS. 8 and 14, upon exiting bonnet 68, the fluid collects in annular chamber 58. The fluid then travels into a bore 88 extending from bore 57 and into an intermediate fluid flow passageway 90 formed in housing 52. The bore 88 may be regarded as an outlet of valve assembly 42, or it may be regarded as a segment of intermediate fluid flow passageway 90 (hereinafter passageway 90). The passageway 90 is provided to transport fluid from valve assembly 42 to valve assembly 44, or vice versa. Intermediate fluid flow passageway 90 is analogous to passageway 18 of FIG. 1. Passageway 90 is not limited to that shown and described herein. By way of example, passageway 90 may be provided in the form of a flexible conduit extending between value assemblies 42 and 44.

Referring back to FIGS. 8 and 9, fluid flowing through passageway 90 encounters a pressure change detector 92 that is positioned within passageway 90. It should be understood that fluid freely flows across pressure change detector 92. In other words, pressure change detector 92 does not block the flow of fluid through passageway 90. Pressure change detector 92 merely reacts to pressure changes within passageway 90 without impinging upon the flow of fluid through passageway 90. Pressure change detector 92 is described in greater detail with reference to FIG. 17.

Once the fluid reaches the end of passageway 90, it travels through valve assembly 44. Because the duplex valve assembly 40 is symmetrical, fluid travels through valve assembly 44 in the reverse direction as it travelled through valve assembly 42. More specifically, the fluid travels from passageway 90 into a bore 88' of valve assembly 44. The bore 88' may be regarded as an inlet of valve assembly 44 or it may be regarded as a segment of passageway 90.

Figure 9:
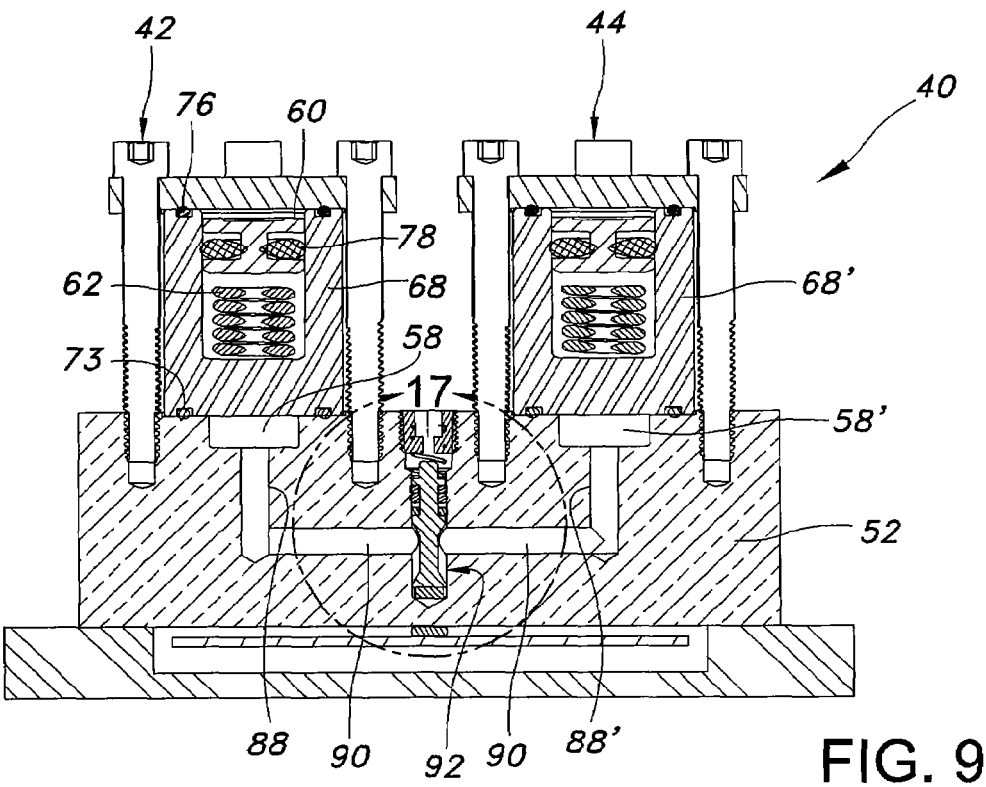
FIG. 9 is a cross-sectional view of the duplex valve assembly of FIG. 3 taken along the lines 9-9.
Figure 10:
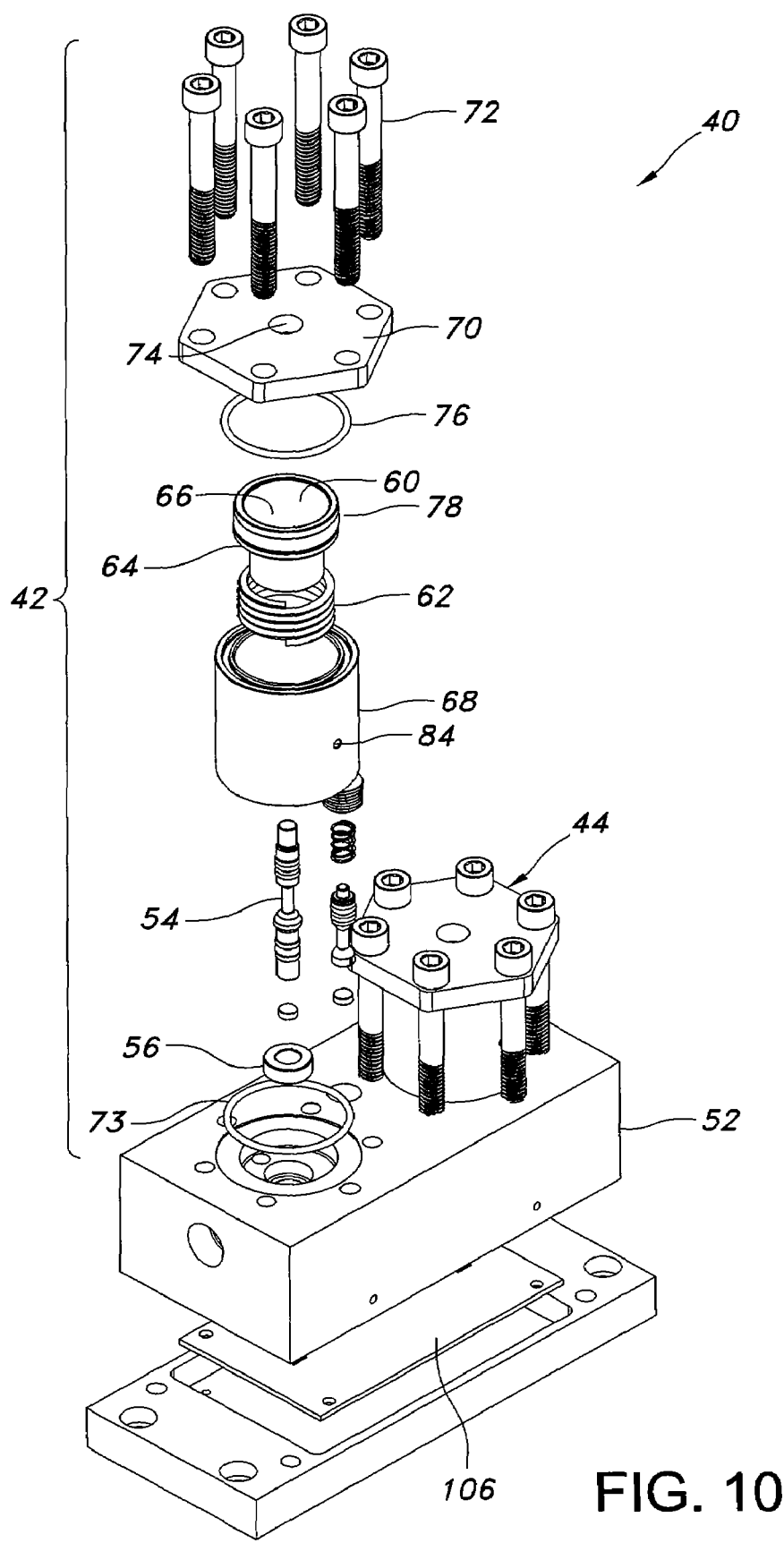
FIG. 10 is an exploded view of the duplex valve assembly of FIG. 2.

Referring now to FIGS. 8, 9 and 15, the fluid travels through bore 88' of housing 52 and is expelled into annular chamber 58'. The fluid contained within annular chamber 58' flows into fluid passages 80' provided in the bottom end portion of bonnet 68'. Upon exiting fluid passages 80', the fluid travels into the top end of stepped bore 57' of valve assembly 44 toward interface between valve stem 54' and valve seat 56'.

The valve stem 54' and valve seat 56' cooperate together to either permit or prohibit the passage of fluid therebetween. It should be understood that in a closed position of valve assembly 44 (as shown in FIG. 8), a sealing surface of valve stem 54' bears on a sealing surface of valve seat 56' to prohibit the passage of fluid past the interface between valve seat 56' and valve stem 54'. Conversely, in an open position of valve assembly 44 (not shown), the valve stem 54' is separated from the valve seat 56' to permit the passage of fluid therebetween.

Assuming that valve assembly 44 is maintained in an open position, fluid passes through the open interface between valve stem 54' and valve seat 56'. The fluid then travels into a fluid passageway 48' that extends from stepped bore 57'. The fluid is ultimately expelled through an outlet 46' and into a conduit (not shown) for delivery to a target source (not shown). It should be understood that, by virtue of the symmetrical design of duplex valve assembly 40, item 46' may be an inlet and item 46 may be an outlet depending upon how the end-user configures duplex valve assembly 40.

The duplex valve assembly 40 includes a control system 50 for detecting leaks within valve assembly 42 and 44 when both valve assemblies 42 and 44 are maintained in a closed position. According to one aspect of the invention, the control system 50 generally includes means 100 and 100' for indicating whether valve assemblies 42 and 44, respectively, are maintained in a closed position or an open position, a pressure change detector 92, a controller 108 (see FIG. 18) for processing signals transmitted by means 82, 100 and 100', and a means 102 (see FIG. 18) for indicating a fluid leak within duplex valve assembly 40.

With reference now to the individual components of control system 50 of duplex valve assembly 40, the indicating means 100 and 100' are configured to transmit the open or closed status of valve assemblies 42 and 44, respectively, to a controller of control system 50. According to one aspect of the invention, the means 100 and 100' for indicating may be provided in the form of a position sensor for indicating the position of the valve stems 54 and 54' of each valve assembly 42 and 44, respectively.

Figure 16:
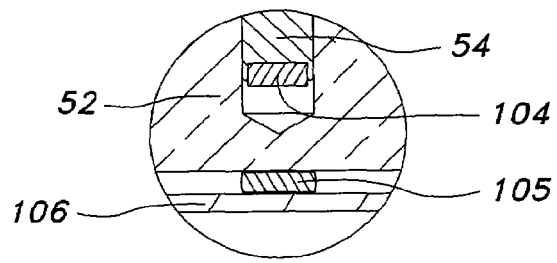
FIG. 16 is a detailed view of a means for indicating whether the valve assembly of FIG. 8 is maintained in a closed state or an open state.

FIG. 16 depicts means 100 for indicating whether valve assembly 42 is maintained in a closed position or an open position, according to one aspect of the invention. Indicating means 100' is structurally and functionally equivalent to indicating means 100. Additionally, indicating means 100 is analogous to indicating means 28 of FIG. 1 and indicating means 100' is analogous to indicating means 30 of FIG. 1.

According to one exemplary embodiment of the invention, indicating means 100 comprises a magnet 104 mounted to the bottom end of valve stem 54 and a Hall-effect sensor 105 mounted to a circuit board 106. The Hall-effect sensor 105 is fixed in position on circuit board 106, whereas magnet 104 translates along with valve stem 54 through bore 57 of housing 52. As shown in FIG. 14, a hole 107 extending between the base of bore 57 and an exterior surface of housing 52 (exposed to atmospheric pressure) enables valve stem 106 to freely translate in bore 57 without compressing air within bore 57.

The Hall-effect sensor 105 is mounted directly beneath magnet 104, such that Hall-effect sensor 105 is positioned to sense a magnetic field of magnet 104. As background, a Hall-effect sensor is a transducer that varies its output voltage in response to changes in magnetic field. The magnetic field of magnet 104 that is sensed by Hall-effect sensor 105 varies as magnet 104 translates along with valve stem 54 through bore 57. In operation, as magnet 104 translates with respect to Hall-effect sensor 105, Hall-effect sensor 105 varies its output voltage. Accordingly, it is possible to determine the relative position of valve stem 54 with respect to its mating valve seat 56 by virtue of the output voltage transmitted by Hall-effect sensor 105. Knowledge of the relative position of valve stem 54 with respect to its mating valve seat 56 makes it possible to determine the open or closed state of valve assembly 42. The output voltage transmitted by Hall-effect sensor 105 is transmitted to a controller 108 (see FIG. 18). Based upon the output voltage transmitted by Hall-effect sensor 105, the controller 108 is programmed to determine the open or closed state of valve assembly 42.

The indicating means 100 and 100' are not limited to a magnet and Hall-effect sensor arrangement, as shown and described with reference to FIG. 16. Various alternatives of means 100 and 100' are envisioned without departing from the scope and spirit of the invention. The indicating means 100 and 100' may generally be provided in the form of a position sensor that is configured to monitor the position of valve stem 54, piston 60 or any other translating component of valve assemblies 42 and 44. Alternatively, the indicating means 100 and 100' may be provided in the form of a pressure sensor that is configured to monitor the pressure across a respective valve assembly. As another alternative, the indicating means 100 and 100' may be provided in the form of a pressure sensor that is configured to monitor the pressure applied to valve seat 56. As yet another alternative, the Hall-effect sensor may be mounted to a moveable component of the valve assembly, while the magnet is fixed in position. The indicating means 100 and 100' may also be provided in the form of a limit switch, a proximity switch, a magnetic reed switch, a contact, an optical detector, an ultrasonic detector, a capacitive position indicator or a visual indicator, for example.

Figure 17:
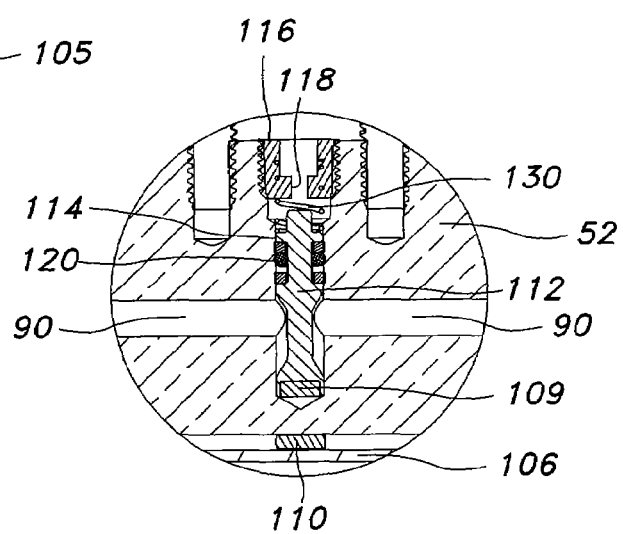
FIG. 17 is a detailed view of a means for determining a pressure change within an intermediate fluid flow passageway of the duplex valve assembly of FIG. 9.

FIG. 17 depicts a pressure change detector 92 for sensing a pressure change within passageway 90. Pressure change detector 92 is analogous to pressure change detector 32 of FIG. 1. Similar to means 100, pressure change detector 92 comprises a magnet 109 mounted to the bottom surface of a piston 112 and a Hall-effect sensor 110 mounted to a surface of circuit board 106. The Hall-effect sensor 110 is fixed in position on circuit board 106 and magnet 109 translates along with piston 112 within a bore 114 of housing 52. The piston 112 translates within bore 114 of housing 52 and is biased by a spring 130 in the direction of magnet 109. One or more o-rings 120 are positioned on piston 112 to limit or prevent fluid within passageway 90 from expelling out of housing 52 through bore 114. As stated previously, piston 112 does not block the flow of fluid through passageway 90. The lower end of piston 112 has an hour-glass shape at the intersection of passageway 90 to permit the passage of fluid across the hour-glass surface of piston 112 and through passageway 90. The piston 112 merely reacts to pressure changes within passageway 90, as described hereinafter.

The top end of piston 112 is exposed to atmospheric pressure, while the bottom end of piston 112 is exposed to the fluid pressure within passageway 90. The piston 112 is configured to translate within bore 114 in response to a change in the pressure within passageway 90. At least two ways are envisioned to expose the top end of piston 112 to atmospheric pressure. As a first option, a plug 116 is coupled to the open end of bore 114 and an aperture 118 is provided in plug 116 to expose the top end of bore 114 to atmospheric pressure, thereby exposing the top end of piston 112 to atmospheric pressure. As a second option, a hole (not shown) may extend through housing 52 between bore 114 and an exterior surface of housing 52 to expose the top end of bore 114 to atmospheric pressure, thereby exposing the top end of piston 112 to atmospheric pressure.

The pressure change detector 92 is configured to determine the occurrence of a pressure change within passageway 90. More particularly, the piston 112 will translate within bore 114 in response to a change in the pressure within passageway 90. The magnet 109 translates along with piston 112. A magnetic field of magnet 109 that is sensed by Hall-effect sensor 110 varies as magnet 109 translates along with piston 112. As the magnet 109 translates with respect to Hall-effect sensor 110, Hall-effect sensor 110 varies its output voltage. Accordingly, by virtue of the varying output voltage transmitted by Hall-effect sensor 110, it is possible to sense the occurrence of a pressure change within passageway 90. More particularly, Hall-effect sensor 110 transmits the varying output voltage to controller 108 (see FIG. 18). Based upon the varying output voltage transmitted by Hall-effect sensor 110, the controller 108 is programmed to determine the occurrence of a pressure change within passageway 90.

The pressure change detector 92 is not limited to a magnet and Hall-effect sensor arrangement. The pressure change detector 92 may be any type of position sensor that can be configured to monitor the position of piston 112. Alternatively, the pressure change detector 92 may be provided in the form of a pressure sensor that is configured to monitor the pressure within passageway 90. As another alternative, the pressure change detector 92 may be provided in the form of a flow meter that is at least partially positioned within passageway 90. The pressure change detector 92 may also be provided in the form of a displaced piston, a pressure transducer, a pressure gage, an electronically read Bourdon tube, a strain gage, a manometer, or any other pressure change detector known in the art. The pressure change detector 92 is also referred to herein as a pressure change sensing means, i.e., a means for sensing a pressure change within passageway 90.

Figure 18:
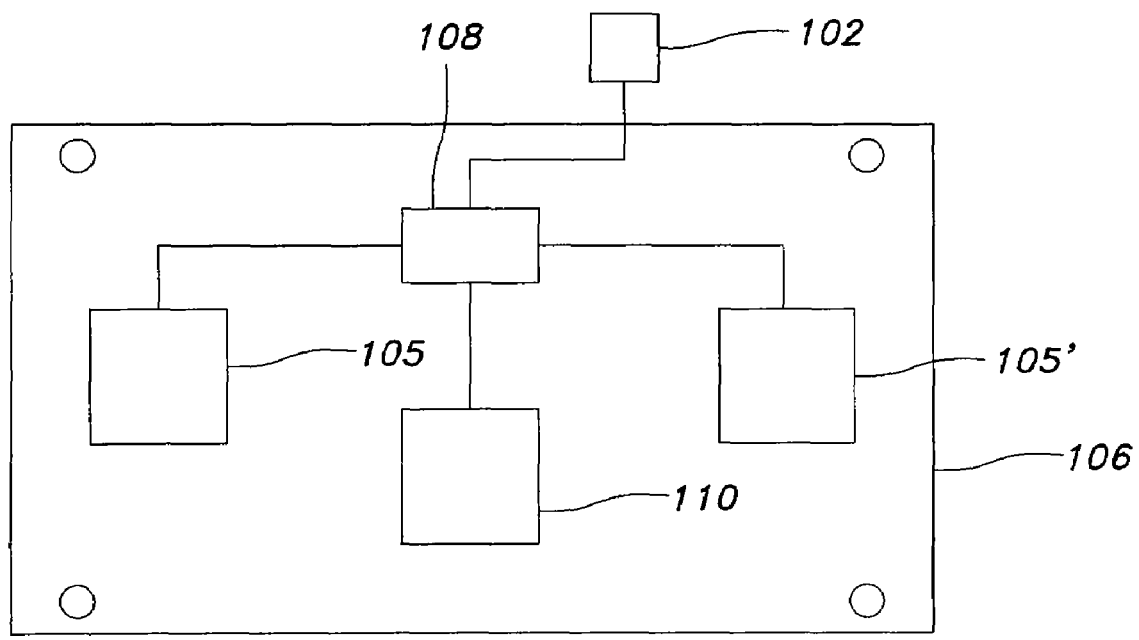
FIG. 18 is a schematic view of a circuit board assembly of a control system of the duplex valve assembly of FIGS. 8-10.

FIG. 18 depicts a schematic view of circuit board assembly 106 of control system 50. According to this exemplary embodiment, controller 108, and Hall-effect sensors 105, 105' and 110 are operably mounted to a circuit board. The controller 108 includes at least three inputs for receiving signals that are transmitted from Hall-effect sensors 105, 105' and 110. A processor (not shown) of the controller 108 is configured to determine the setting of each valve assembly 42 and 44 (i.e., a closed or open position) based upon the signals transmitted by Hall-effect sensors 105 and 105', respectively. The processor of the controller 108 is further configured to determine whether Hall-effect sensor 110 sensed a pressure change within passageway 90, and, optionally, a value corresponding to and indicative of that pressure change.

In the event that the signal transmitted by Hall-effect sensor 110 indicates a pressure change occurrence in passageway 90 while the signals transmitted by Hall-effect sensors 105 and 105' indicate that both valve assemblies 42 and 44 are maintained in a 25 closed position, the controller 108 is configured to transmit a signal to indicate the occurrence of a leak within the duplex valve assembly 40. More particularly, in the event that controller 108 determines that a pressure change occurred within passageway 90 when valve assemblies 42 and 44 are maintained in a closed position, the controller 108 is configured to transmit a signal to a means 102 for indicating. The indicating means 102 is analogous to means 36 of FIG. 1. The controller 108 includes an output for communicating with the means 102 for indicating. The indicating means 102 may be mounted to circuit board assembly 106, or may be a separate component that is connected to controller 108, as depicted in FIG. 18.

The means 102 for indicating is intended to alert an end-user that one or more of valve assemblies 42 and 44 of duplex valve assembly 40 is leaking fluid. The indicating means 40 may be visual or audible. By way of non-limiting example, the indication to the end-user may provided by way of an LED light, a prompt on a computer monitor, an audible beep, a visual signal, a reading on a dial, or any other means for indicating known in the art. The signal transmitted by the controller 108 indicating an occurrence of a leakage may be relayed to a computer, a programmable logic controller (PLC) or other controlling device that is configured to take a control action to isolate the leak or otherwise alter the state of the connected system.

If valve assembly 42 of the duplex valve assembly 40 fails, thereby permitting fluid to flow within passageway 90, the fluid pressure within passageway 90 would increase. The pressure increase within passageway 90 would cause piston 112 to rise in bore 114 thereby causing magnet 109 to move away from Hall-effect sensor 110. The Hall-effect sensor 110 would sense a decrease in the magnetic field and transmit a signal to controller 108 indicating an increase in pressure (or a pressure change, generally). The processor of the controller 108 is configured to determine the open or closed state of valve assemblies 42 and 44 by way of means 100 and 100', as described previously. Once the processor of the controller 108 recognizes that valve assemblies 42 and 44 were set to a closed position while a change in pressure within passageway 90 had occurred, the processor would transmit a signal to indicating means 102 to alert the end user to the leakage of valve assembly 42, or, more generally, a leakage of duplex valve assembly 40.

Alternatively, if valve assembly 44 of duplex valve assembly 40 fails, thereby permitting fluid to flow out of passageway 90, the fluid pressure within passageway 90 would decrease. The pressure drop within passageway 90 would cause piston 112 to fall in bore 114 thereby causing magnet 109 to move toward Hall-effect sensor 110. The Hall-effect sensor 110 would sense an increase in the magnetic field and transmit a signal to controller 108 indicating a decrease in pressure (or a pressure change, generally). The processor of controller 108 is configured to determine the open or closed state of valve assemblies 42 and 44 by way of means 100 and 100', as described previously. Once the processor of the controller 108 recognizes that valve assemblies 42 and 44 were set to a closed position while a change in pressure had occurred within passageway 90, the processor would transmit a signal to indicating means 102 to alert the end user to the leakage of valve assembly 44, or, more generally, a leakage of duplex valve assembly 40.

According to one aspect of the invention, the processor of the controller 108 is configured to calculate or interpolate a value indicative of a pressure change within passageway 90 based upon the signal received from Hall-effect sensor 110. The processor of the controller 108 is optionally configured to compare that pressure change value with a pre-determined threshold value. If the pressure change value exceeds the pre-determined threshold value, the controller 108 will transmit a signal to indicating means 102. Conversely, if the pressure change value does not exceed the pre-determined threshold value, the controller 34 will take no action.

Although not shown, the control system may include a clock for time-stamping each pressure change occurrence in an effort to determine the timing and duration of any such occurrence(s). According to one aspect of the invention, controller 108 will only transmit a signal to indicating means 102 if the time duration of the leakage exceeds a minimum threshold value.

According to one exemplary method of leak testing duplex valve assembly 40, the valve assembly 42 is coupled to a fluid source (not shown). The valve assembly 42 is opened and valve assembly 44 is closed. The fluid source is opened to introduce fluid into duplex valve assembly 40 through open valve assembly 42. The fluid source is then closed. The valve assembly 42 is then closed. The fluid source is opened again to introduce fluid into duplex valve assembly 40. The end-user waits for an indication from indicating means 102 that a leak has occurred within duplex valve assembly 40.

While preferred embodiments of the invention have been described herein, it will be understood that such embodiments are provided by way of example only. Numerous variations, changes and substitutions will occur to those skilled in the art without departing from the spirit of the invention. For example, the duplex valve assembly disclosed herein is not limited to distributing any particular type of fluid. The duplex valve assembly may be configured to distribute liquids, gases, flammable or non-flammable fluids, water, industrial mixtures, hydrocarbon mixtures, reactor gas mixtures or any other fluid. It is intended that the appended claims cover all such variations as fall within the spirit and scope of the invention.

What is claimed:

1. A duplex valve assembly comprising:
    a first valve assembly including an inlet opening for receiving fluid, an outlet opening for delivery of fluid, a fluid flow passageway defined between the inlet opening and the outlet opening, and means for controlling the flow of fluid through the fluid flow passageway;
    means for indicating whether said first valve assembly is in a closed position or an open position;
    a second valve assembly including an inlet opening for receiving fluid, an outlet opening for delivery of fluid, a fluid flow passageway defined between the inlet opening and the outlet opening, and means for controlling the flow of fluid through the fluid flow passageway;
    means for indicating whether said second valve assembly is in a closed position or an open position;
    an intermediate fluid flow passageway defined between the outlet opening of the first valve assembly and the inlet opening of the second valve assembly, the intermediate fluid flow passageway positioned for the delivery of the fluid from the first valve assembly to the second valve assembly;
    a pressure change detector within the intermediate fluid flow passageway, said pressure change detector at least partially positioned within the intermediate fluid flow passageway to detect fluid leakage at either the first valve assembly or the second valve assembly; and
    a control system for receiving signals from said indicating means and said pressure change detector,
    said control system configured to indicate fluid leakage when said pressure change detector detects a change of pressure within the intermediate fluid flow passageway and said indicating means indicate that the valve assemblies are maintained in a closed position,
    wherein, in the event of a fluid leakage, said control system is configured to determine which of the valve assemblies has failed based entirely upon the change in pressure detected by the pressure change detector.

2. The duplex valve assembly of claim 1, wherein the controlling means of the first and second valve assemblies each includes a valve seat positioned within the fluid flow passageway and a valve stem cooperating with the valve seat,
    wherein in a closed position of a valve assembly the valve stem bears on the valve seat to block the flow of fluid through the fluid flow passageway and in an open position of a valve assembly the valve stem is separated from the valve seat to permit the flow of fluid through the fluid flow passageway.

3. The duplex valve assembly of claim 2, wherein each indicating means comprises a position sensor for indicating the position of the valve stem within the fluid flow passageway of a valve assembly.

4. The duplex valve assembly of claim 3, said position sensor comprising a magnet mounted to the valve stem and a Hall-effect sensor positioned adjacent the magnet, said Hall-effect sensor configured to provide an output voltage responsive to movement of the magnet.

5. The duplex valve assembly of claim 1, wherein the pressure change detector comprises a piston at least partially positioned within the intermediate fluid flow passageway, a portion of the piston positioned for exposure to fluid within the intermediate fluid flow passageway and another portion of the piston positioned for exposure to atmospheric pressure, said piston moveable in response to a change of pressure within the intermediate fluid flow passageway.

6. The duplex valve assembly of claim 5, wherein said pressure change sensing means comprises a position sensor for indicating the position of the piston moveably positioned within the intermediate fluid flow passageway.

7. The duplex valve assembly of claim 6, said position sensor comprising a magnet mounted to the piston and a Hall-effect sensor positioned adjacent the magnet, said Hall-effect sensor configured to provide an output voltage responsive to movement of the magnet.

8. A leak detection system for detecting fluid leakage within a duplex valve assembly including a first valve, a second valve and an intermediate fluid flow passageway fluidly connecting the first valve to the second valve, said system comprising:
    means for indicating whether said first valve is in a closed position or an open position;
    means for indicating whether said second valve is in a closed position or an open position; and
    a pressure change sensing means for sensing fluid within the intermediate fluid flow passageway, said pressure change sensing means at least partially positioned within the intermediate fluid flow passageway for detecting pressure change within the intermediate fluid flow passageway; and
    a controller for receiving signals from said indicating means and said pressure change sensing means, said controller configured to indicate a status of said pressure change sensing means when said indicating means indicate that the first and second valves are closed,
    wherein, in the event of a fluid leakage, said controller is configured to determine which of the valves has failed based entirely upon the change in pressure detected by the pressure change sensing means.

* * * * *